Patented June 22, 1954

2,681,883

UNITED STATES PATENT OFFICE 2,681,833

RECOVERY OF HEAVY WATER FROM REACTED SOLUTIONS THEREOF

Clarence F. Hiskey, New York, N. Y., assignor to the United States of America as represented by the United States Atomic Energy Commission No Drawing. Application January 7, 1946, Serial No. 640,394

3 Claims. (Cl. 202—57)

This invention relates to neutronic reactors and particularly to the recovery of heavy water from solutions of heavy water ($D_2O$) and reactive material used as the reactive composition in neutronic reactors.

One of the principal objects of the present invention is to recover the heavy water from the reactive solution after the solution has undergone the desired chain reaction.

Another object is to recover the heavy water from the solution in a more simple and efficient manner.

A specific object is to recover heavy water from a solution of uranyl fluoride and heavy water after the solution has undergone a chain reaction.

A correlative object is to provide a recovery process which may be carried out in stainless steel tanks and equipment without undue corrosion and pitting of the equipment by the agents and combinations thereof existing in the solution and added for augmenting recovery of heavy water.

Other objects and advantages will become apparent from the illustrative embodiment of the invention, as hereinafter described.

In a solution type of neutronic reactor, the solution compises heavy water, ($D_2O$), as a carrier and moderator, and a reactive form of uranium as the fissionable material. After irradiation of the solution, it is preferable to separate the product from the heavy water as a first step in recovery of the product and to permit recovery and reuse of the heavy water itself which is very expensive and difficult to produce in large quantities.

A reactive solution which has been found satisfactory and is used at present is uranyl fluoride and heavy water ($D_2O$).

In the recovery of $D_2O$ from such a solution after the solution has been irradiated at high neutron densities, direct distillation results in partial hydrolysis in accordance with the following:

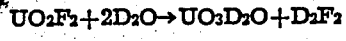
$$UO_2F_2 + 2D_2O \rightarrow UO_3D_2O + D_2F_2$$

Such a reaction results in compounds which corrode the equipment and in contamination of the distillate along with a loss of some of the heavy water.

The deuterium fluoride vapor can be removed to a large extent prior to condensation by passing the vapor over silver impregnated asbestos, and the solution can be dehydrated without decomposition by evaporating it in air at 120° C., but the loss of heavy water in such a method would be too great and the solution in any event would be corrosive to some of the stainless steel equipment used, particularly at the welds.

In accordance with the present invention, $UO_3$ is added to the uranyl fluoride solution prior to evaporation to prevent hydrolysis and formation of deuterium fluoride with its attendant corrosive effects. The $UO_3$ should be carefully dehydrated for use.

It has been found that the addition of an excess of $UO_3$ to a saturated uranyl fluoride solution during or prior to evaporation reduces the corrosion during evaporation ten fold. About 5 to 20 mol per cent of $UO_3$ based upon the number of mols of $UO_2F_2$, is generally used in this process.

The addition of the $UO_3$ in excess reduces greatly the carry over of the fluoride in the heavy water distillate.

Following the distillation step the uranium oxide must be dehydrated carefully for subsequent use and the solid cake resulting from the distillation requires a somewhat higher temperature for final dehydration because $UO_3$ requires a temperature of more than 350° C. for complete dehydration whereas uranyl fluoride requires only 120° C.

The gelatinous nature of $UO_2F_2$-$UO_3$ mixture in the final distillation stage is somewhat difficult to handle.

Consequently, the dehydration of the uranyl fluoride cake in thick layers which would be formed during final evaporation in a large tank is especially difficult.

Therefore, the final dehydration preferably is effected by means of heating shallow trays of the concentrated uranyl fluoride. Removal of $D_2O$ by this method is almost complete.

If desired, all tanks and equipment used in the method may be protected further against possible corrosion by coating the surfaces to be exposed with Heresite resin to form a skin about 0.001 inch thick.

Having thus described the invention what is claimed is:

1. In the method of recovering heavy water from a solution of heavy water and uranyl fluoride by distillation of the heavy water, the step of conducting the distillation of the heavy water in the presence of $UO_3$.

2. In the method of recovering heavy water from a solution of heavy water and uranyl fluoride by distillation of the heavy water, the step of adding to the solution prior to distillation of the heavy water a quantity of $UO_3$ up to about 20% of the $UO_2F_2$ present in the solution.

3. The method of recovering heavy water from a solution of heavy water and uranyl fluoride which comprises adding $UO_3$ to the solution in an amount sufficient to prevent hydrolysis and formation of deuterium fluoride, and then distilling the resultant solution.

No references cited.